United States Patent Office 3,104,974
Patented Sept. 24, 1963

3,104,974
PROCESS FOR IMPROVING THE BREWING
CHARACTERISTICS OF HOPS
Pavel Weiner, 15 Boulevard Roosevelt, Luxembourg
No Drawing. Filed Jan. 25, 1962, Ser. No. 168,841
Claims priority, application Luxembourg Jan. 30, 1961
3 Claims. (Cl. 99—50.5)

Hops which have been freshly picked and are then used either immediately, or after having been stored for a reasonably short period, for brewing, contain etheric oils which are of considerable importance for the taste of the resulting beer. Since hops cannot always be processed immediately after picking, the storage of hops represents a special problem, since hops stored in the open air start to decompose immediately even when given a conventional drying treatment to reduce their water content to from about 10 to 12% by weight. Decomposition proceeds more rapidly if the air in contact with the hops is moist, and if the temperature at which the hops are stored is high.

Known methods of ensuring that hops retain their desirable qualities even during long storage are, therefore, based on storing the hops at a low temperature and in dry air, or on keeping atmospheric air away from the hops while they are in store and while they are being conveyed to the brewery. The hops are therefore placed in gas-tight vessels, the air being then sucked out of the vessel and replaced by an inert gas, usually carbon dioxide. In another known process to improve the keeping properties of hops, they are compressed into a rigid block, then enclosed in a gas-previous envelope, and temporarily subjected to a low ambient pressure of from about 1.5 to 2.3 mm. of mercury, whereafter they can be stored in the open air for a longer but still limited time.

All these methods of storing or improving the keeping properties of hops are expensive, increase the cost of the hops, and cannot prevent the gradual advance of the decomposition processes which start immediately the hops have been picked. Such processes lead to the formation and collection in the hops of undesirable odorants and flavoring substances which are imparted very rapidly to the beer brewed with such hops. Although some of these volatile substances evaporate with the steam while the mash is being boiled with the hops, the flavor of the mash is nevertheless impaired and this deficiency is clearly perceptible in the finished beer.

The main groups of flavoring substances which impair the taste of beer are substances which are naturally present in some kinds of hops, substances arising out of natural aging of the hops, and substances produced by very bad storage conditions.

There are also other flavoring substances which the hops can pick up from the ambient air while they are in store.

Many breweries endeavour to improve the brewing properties of a hop having undesirable flavor substances by brewing or even boiling the hops before they are added to the mash. This step does not remove all the unwanted substances and also has the disadvantage of removing from the hops ingredients which are very important for brewing, for such ingredients are, like the unwanted decomposition products, etheric oils or resins which are readily soluble in water and are transferred into the water used for brewing or boiling and so separated from the hops with such water.

According to the present invention loose hops are introduced into a gas-tight vessel which is then evacuated to a pressure between 15 and 5 mm. of mercury and maintained at that pressure for from 15 to 60 minutes by introducing pure air or a neutral gas as the remaining atmosphere is sucked out.

This process has the effect of removing from the hops every kind of flavor substance which impairs the beer, but only such substances, and so does not significantly reduce the content in the hops of these flavor substances which are important for brewing.

What the residual pressure maintained in the treatment vessel should be, within the limits specified, depends upon the extent to which unwanted flavor substances are present in the hops, but the pressure should not go any lower than the bottom limit of 5 mm. of mercury, since at this pressure the hops start to release the volatile aroma substances which are useful in brewing. Similarly, the treatment time largely depends upon the proportion of unwanted flavour substances, but it is better to treat the hops at a relatively high residual pressure in the vessel for a relatively long time, rather than to reduce the residual pressure to the lower limit specified or even further in order to shorten the treatment time.

The results of the treatment just outlined can very easily be determined directly after treatment by an odor test. If such a test is unsatisfactory, the treatment can readily be repeated one or more times.

To ensure that decomposition and production of further unwanted flavorings does not restart in hops which have been treated in accordance with the invention, it is preferable to apply the process according to the invention immediately before the hops are added to the mash.

If, as is often done, the hops are ground before being added to the mash, it is convenient to apply the process according to the invention after the hops have been ground, since unwanted flavoring substances are formed as a result of the heat generated when the hops are ground. Treatment after grinding removes these undesirable substances.

The apparatus for carrying out the process is very simple for instance, the vessel can have, in addition to the connection for the suction pump, another connection through which it can be connected to a fresh air or inert gas source. This other connection can take the form of a valve which opens when the required pressure in the vessel is reached, so that the air or gas enters the vessel as soon as the pressure to which the valve has been set is reached and for as long as that pressure is maintained.

Extended experiments and the practical application of the process according to the invention have confirmed that all the disadvantages associated with the hop are obviated, hop aroma is improved very considerably, and so unwanted flavoring substances or odorants do not enter the beer, thereby yielding in a beer having a very fine aroma.

Example

From a hop pocket which had been stored for several months, a proportion having an unpleasant cheesy smell was removed, loosened up by being crumbled, and subjected to a low pressure of 10 mm. of mercury for 15 minutes. The atmosphere which continued to be sucked out of the vessel after the pressure of 10 mm. of mercury had been reached because of continuing operation of the pump was replaced by a supply of fresh air. The cheesy smell was not perceptible after this treatment, and the beer brewed with the hops thus treated was free of any unwanted secondary flavor.

I claim:
1. In a process for brewing hops, the step of improving the brewing characteristics of said hops by introducing said hops in a loose state into a gas-tight vessel and evacuating said vessel to maintain a reduced pressure between substantially 5 and 15 mm. of mercury for a period between substantially 15 and 60 minutes and introducing a purging gas incapable of adversely affecting said hops while maintaining said reduced pressure.

2. In a process for brewing hops, the step of improving the brewing characteristics of said hops by introducing said hops in a loose state into a gas-tight vessel and evacuating said vessel to maintain a reduced pressure between substantially 5 and 15 mm. of mercury for a period between substantially 15 and 60 minutes and introducing a purging gas incapable of adversely affecting said hops while maintaining said reduced pressure, said hops being brewed immediately after treatment at said reduced pressure.

3. In a process for brewing hops, the step of improving the brewing characteristics of said hops by introducing said hops in a loose state into a gas-tight vessel and evacuating said vessel to maintain a reduced pressure between substantially 5 and 15 mm. of mercury for a period between substantially 15 and 60 minutes and introducing a purging gas incapable of adversely affecting said hops while maintaining said reduced pressure, the hops being comminuted prior to treatment thereof at said reduced pressure.

References Cited in the file of this patent
UNITED STATES PATENTS

| | | |
|---|---|---|
| 75,203 | Schoonmaker | Mar. 3, 1868 |
| 121,902 | Seeger et al. | Dec. 12, 1871 |
| 2,542,206 | Nichols | Feb. 20, 1951 |